(12) United States Patent
Bianco et al.

(10) Patent No.: US 11,014,463 B2
(45) Date of Patent: May 25, 2021

(54) EVSE CABLE MANAGEMENT SYSTEM WITH ADA ASSIST

(71) Applicant: Control Module, Inc., Enfield, CT (US)

(72) Inventors: James S. Bianco, Suffield, CT (US); David C. Parmelee, East Hartland, CT (US); David B. Palmer, Middletown, CT (US); John Fahy, Longmeadow, MA (US)

(73) Assignee: Control Module, Inc., Enfield, CT (US)

( * ) Notice: Subject to any disclaimer, the term of this patent is extended or adjusted under 35 U.S.C. 154(b) by 228 days.

(21) Appl. No.: 15/997,115

(22) Filed: Jun. 4, 2018

(65) Prior Publication Data

US 2018/0272880 A1    Sep. 27, 2018

Related U.S. Application Data

(63) Continuation of application No. 15/613,829, filed on Jun. 5, 2017, now abandoned, which is a (Continued)

(51) Int. Cl.
*H02J 7/00* (2006.01)
*B60L 53/30* (2019.01)
(Continued)

(52) U.S. Cl.
CPC .............. *B60L 53/30* (2019.02); *B60L 3/04* (2013.01); *B60L 53/16* (2019.02); *B60L 53/18* (2019.02); *B65H 75/4471* (2013.01); *B65H 75/4484* (2013.01); *B65H 75/4486* (2013.01); *H02J 7/0027* (2013.01); *H02J 7/0045* (2013.01); *B65H 2701/34* (2013.01); *Y02T 10/70* (2013.01); *Y02T 10/7072* (2013.01); *Y02T 90/12* (2013.01); *Y02T 90/14* (2013.01)

(58) Field of Classification Search
CPC ........ H02J 7/0027; B60L 53/16; B60L 53/18; B60L 53/30
USPC ........................................................ 320/109
See application file for complete search history.

(56) References Cited

U.S. PATENT DOCUMENTS

| | | | | |
|---|---|---|---|---|
| 4,036,147 A | * | 7/1977 | Westling | ................. B61B 15/00 104/23.1 |
| 5,421,489 A | * | 6/1995 | Holzner, Sr. | ......... A47K 5/1208 222/181.2 |

(Continued)

*Primary Examiner* — Suresh Memula
(74) *Attorney, Agent, or Firm* — Alix, Yale & Ristas, LLP

(57) ABSTRACT

A cable management system for an overhead EVSE employs a lever-latch on the EV connector. A controller and motor mechanism is employed to lower the connector to an ADA compliant position or a pre-established height which is typically four feet. For an overhead system which employs a shuttle which slides along a track, the connector may then be grasped to pull the shuttle to a selected position along the track. The latch is depressible to extend the service cable to the connector so that the connector may be positioned and connected at the EV inlet. When the connector is unlatched from the EV inlet, the latch may be depressed to retract the connector to the pre-established height or ADA position. The latch requires a force of less than 5 lbs. for activation.

14 Claims, 14 Drawing Sheets

Related U.S. Application Data continuation-in-part of application No. 15/192,253, filed on Jun. 24, 2016, now Pat. No. 9,950,634, which is a continuation-in-part of application No. 14/915,717, filed as application No. PCT/US2015/039684 on Jul. 9, 2015, now Pat. No. 9,908,422.

(60) Provisional application No. 62/022,844, filed on Jul. 10, 2014, provisional application No. 62/515,770, filed on Jun. 6, 2017.

(51) Int. Cl.
  *B60L 3/04* (2006.01)
  *B65H 75/44* (2006.01)
  *B60L 53/18* (2019.01)
  *B60L 53/16* (2019.01)

(56) References Cited

U.S. PATENT DOCUMENTS

| | | | |
|---|---|---|---|
| 2006/0196986 A1* | 9/2006 | Gremmels | B25H 1/0057 242/371 |
| 2009/0173395 A1* | 7/2009 | Godfrey | B65H 75/368 137/355.25 |
| 2010/0102775 A1* | 4/2010 | Chander | B60L 53/31 320/109 |
| 2011/0074351 A1* | 3/2011 | Bianco | E04H 6/025 320/109 |
| 2012/0013300 A1* | 1/2012 | Prosser | B60L 53/63 320/109 |
| 2012/0032635 A1* | 2/2012 | Prosser | B60L 53/30 320/109 |
| 2012/0048983 A1* | 3/2012 | Bianco | B60L 53/31 242/388.9 |
| 2012/0280656 A1* | 11/2012 | Bedell | B60L 5/42 320/109 |
| 2012/0326664 A1* | 12/2012 | Venegas, Jr. | B60L 53/18 320/109 |
| 2013/0320921 A1* | 12/2013 | Muller | H02J 7/0042 320/109 |
| 2013/0334829 A1* | 12/2013 | Hagemeyer | E05B 1/003 292/336.3 |
| 2014/0021915 A1* | 1/2014 | Staley | H02J 7/0027 320/109 |
| 2014/0077761 A1* | 3/2014 | Hamrin | B60L 53/305 320/109 |
| 2014/0111158 A1* | 4/2014 | Kinomura | B60L 53/31 320/109 |
| 2016/0159231 A1* | 6/2016 | Jefferies | B60L 53/68 320/109 |
| 2017/0129356 A1* | 5/2017 | Johnson | B60L 53/57 |
| 2017/0158072 A1* | 6/2017 | Sychov | B60L 53/00 |
| 2019/0214807 A1* | 7/2019 | Owens | B65H 57/28 |

* cited by examiner

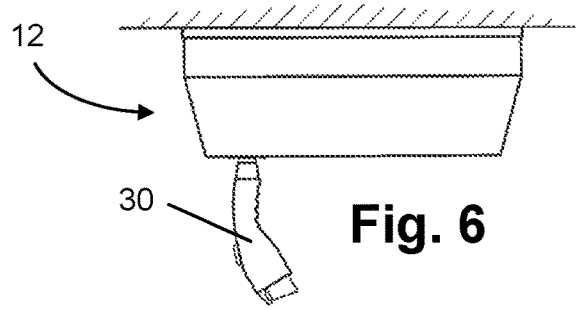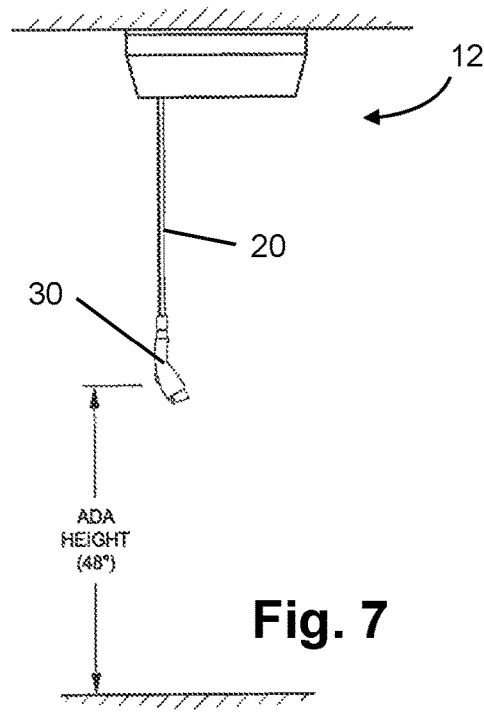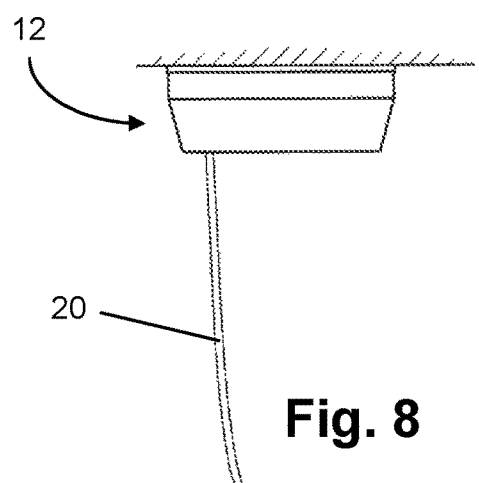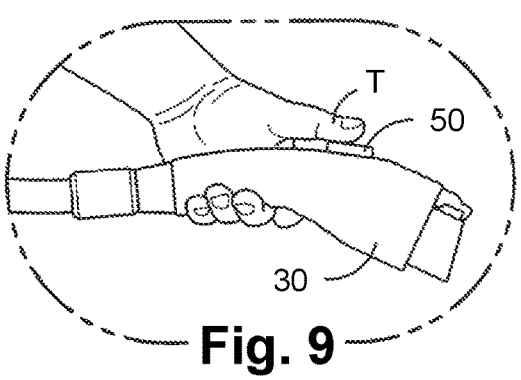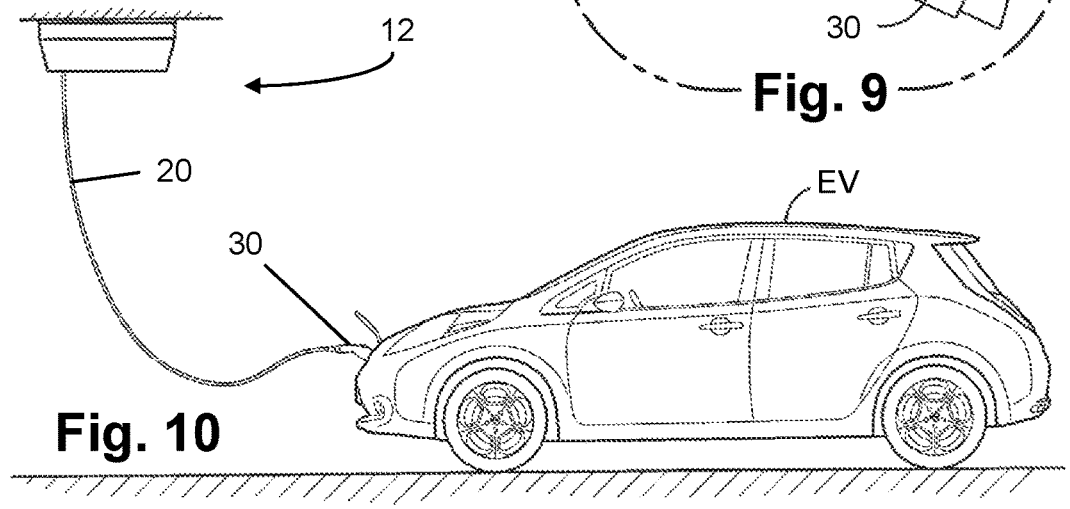

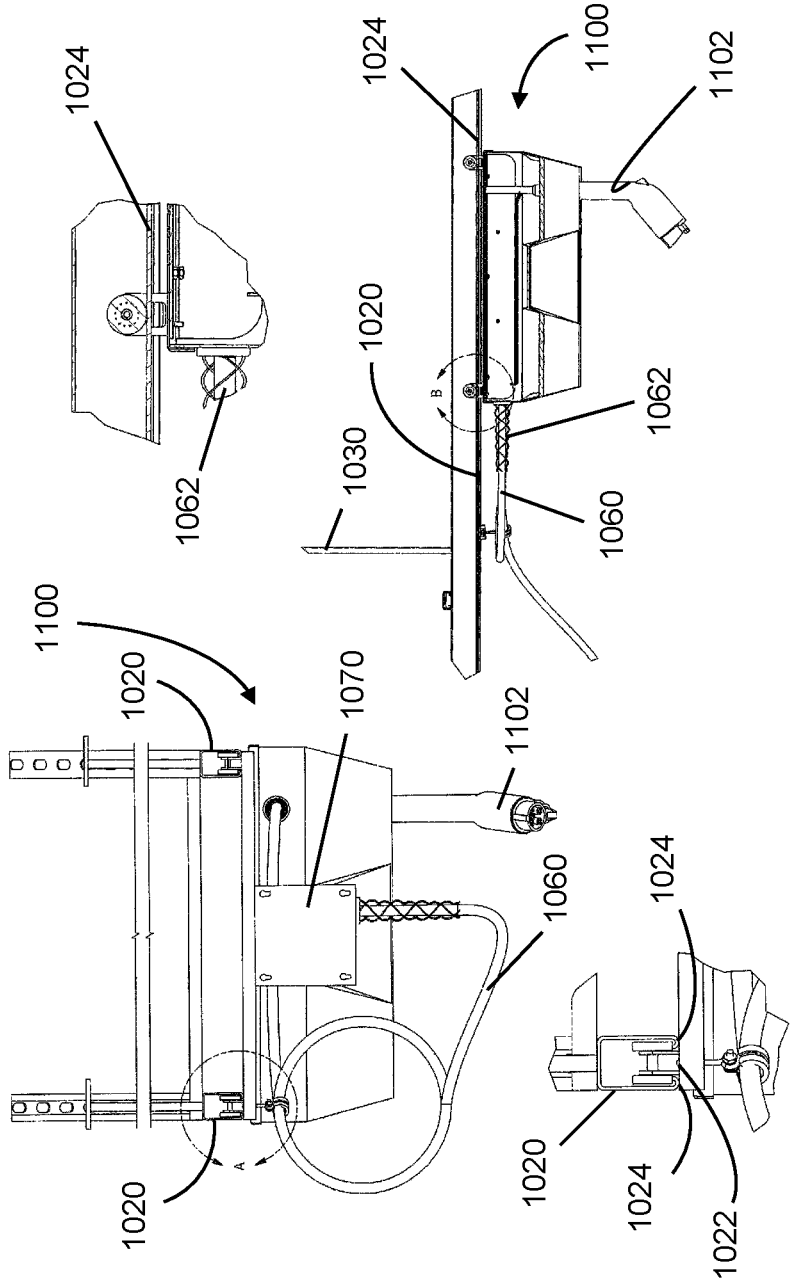

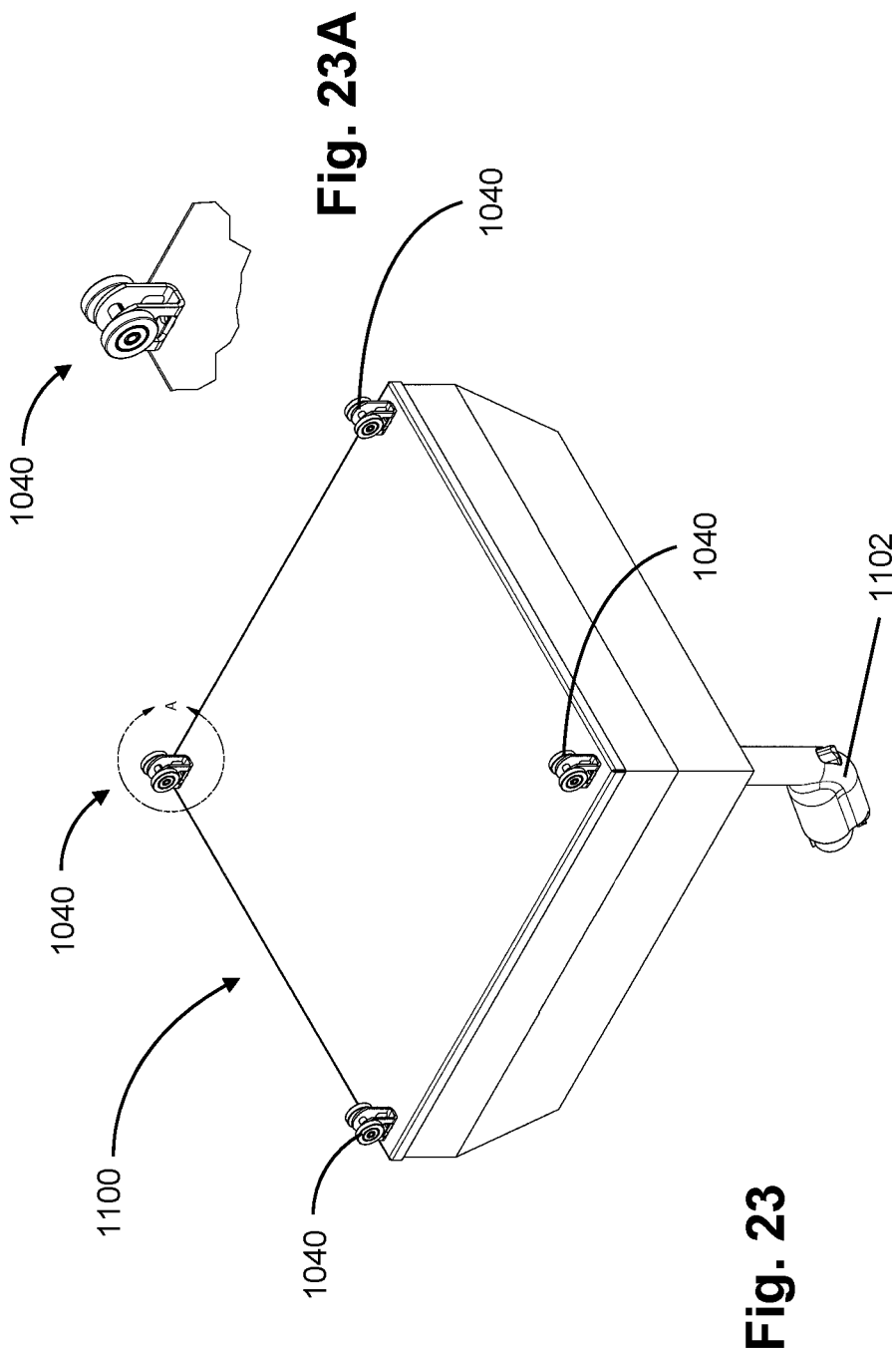

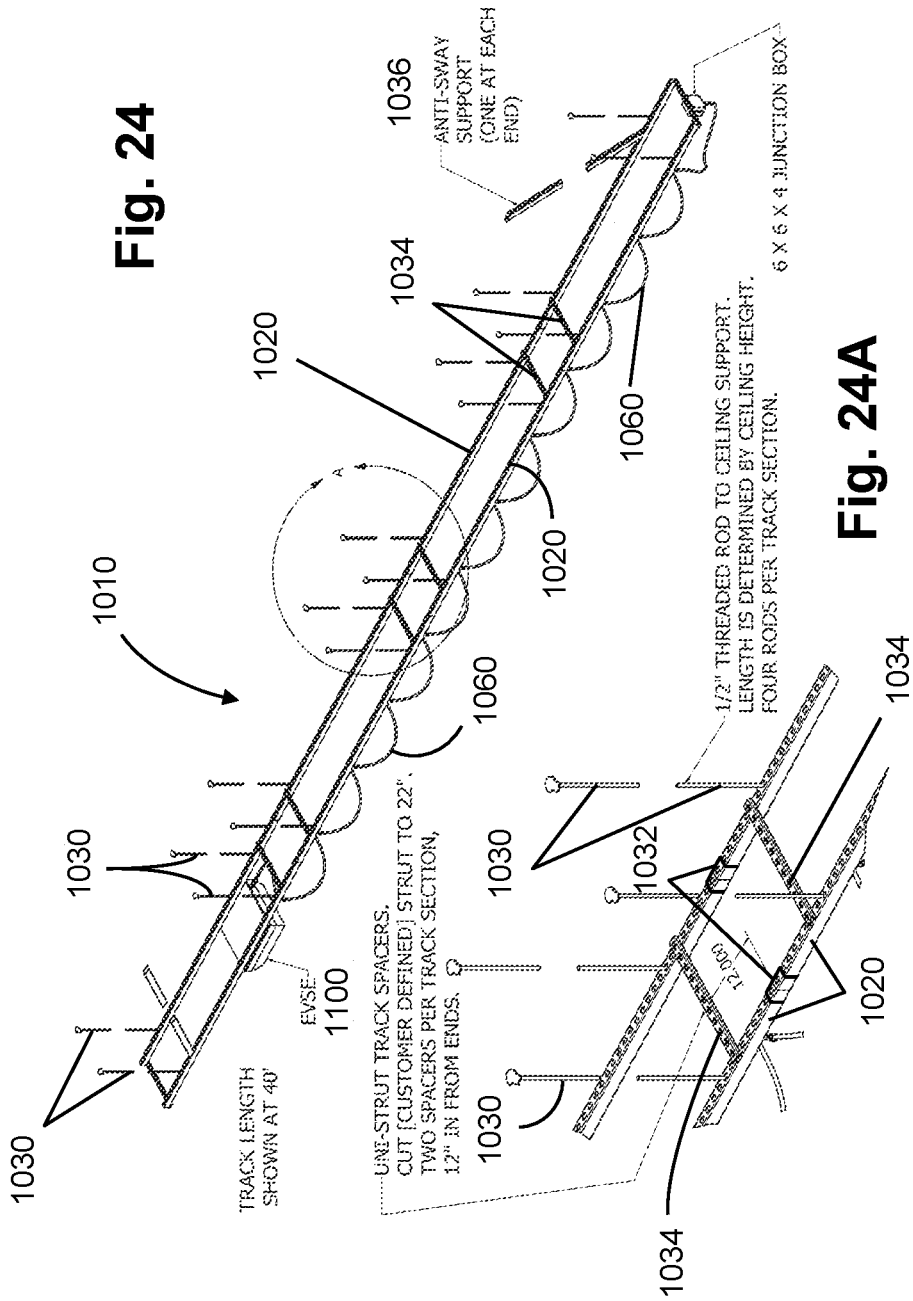

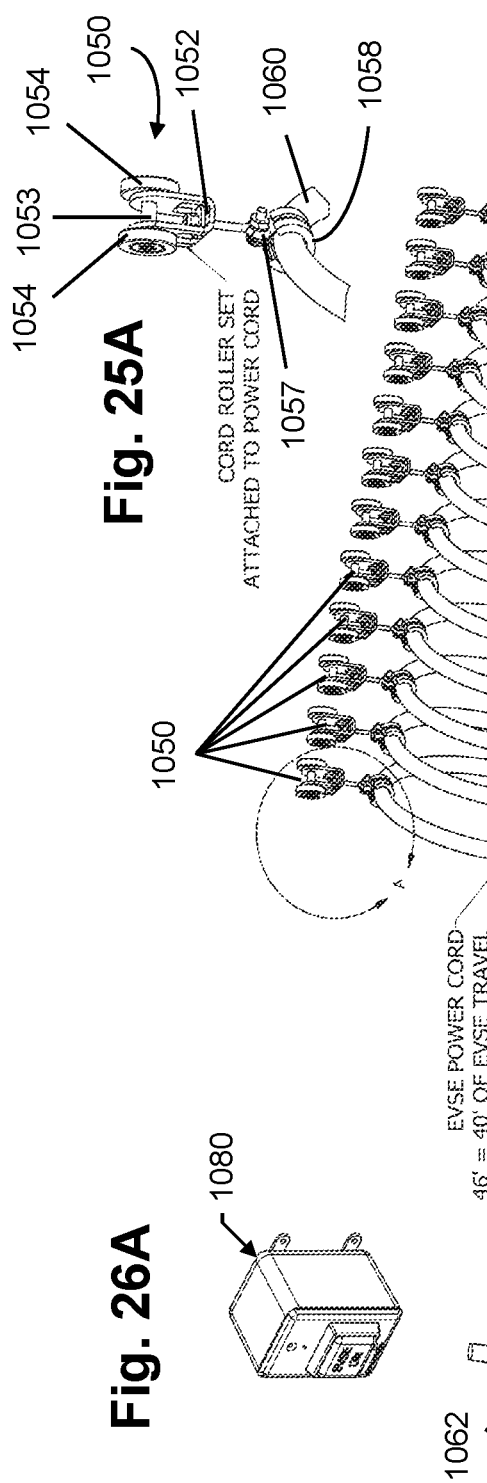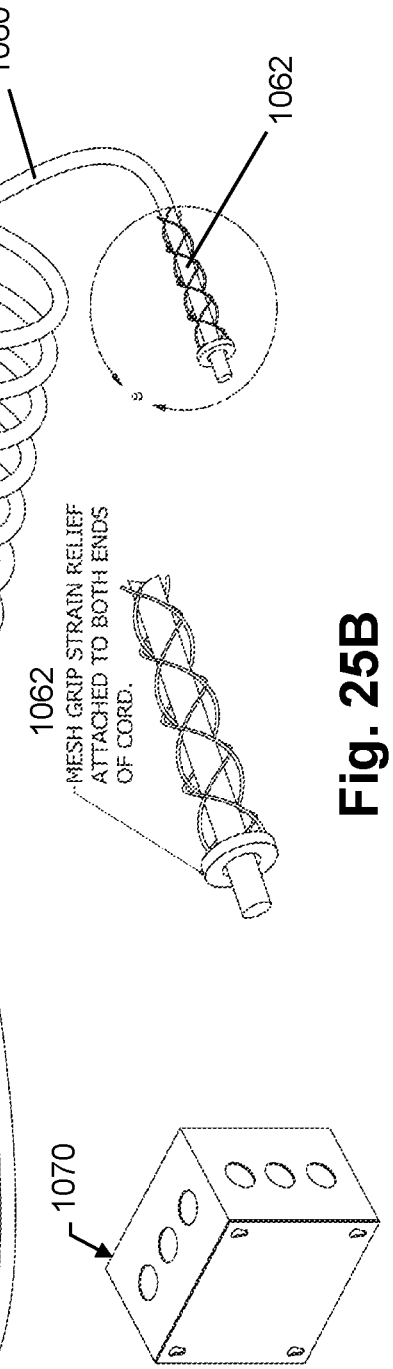

EVSE CABLE MANAGEMENT SYSTEM WITH ADA ASSIST

CROSS-REFERENCE TO RELATED APPLICATION

This claims the priority of U.S. Provisional Patent Application No. 62/515,770 filed on Jun. 6, 2017 and is a continuation of U.S. patent application Ser. No. 15/613,829 filed on Jun. 5, 2017, which application is a continuation-in-part of U.S. patent application Ser. No. 15/192,253 filed on Jun. 24, 2016, which application is a continuation-in-part of U.S. patent application Ser. No. 14/915,717 filed on Mar. 1, 2016, which application is the U.S. National Phase of International Application No. PCT/US2015/039684 filed on Jul. 9, 2015, which application claims the priority of U.S. Provisional Patent Application No. 62/022,844 filed on Jul. 10, 2014, the entirety of which applications are incorporated herein by reference.

BACKGROUND

This disclosure relates generally to EVSE connectors which are suspended from an upper location. More particularly, this disclosure relates generally to EVSE which employs a controller and a motorized mechanism for retracting and extending a cable from an upper housing and wherein said cable is lowered to an ADA (Americans with Disabilities Act) compliant height, such as, for example, four feet, for usage.

In EVSE systems to which the present disclosure relates, a wall mounted or an overhead EVSE mounts an electrical cable at an elevated position. The cable has a compliant EV (electric vehicle) connector, such as a J1772 connector, which connects with the electrical vehicle for charging the electric vehicle. Typically, prior to usage, the connector may be disposed at a height of approximately four feet and must be pulled from either the four foot position or from an elevated position for extending the cable to connect the connector to the EV. It is common for the EVSE systems to extend and retract the cable and the connector in an automated fashion. When the connector is at or below the ADA compliant four foot position, the operator grasps the connector and extends the cable to the electric vehicle.

In order to ensure full ADA operable parts compliance, any operable part must be usable with one hand and not require tight grasping, pinching or twisting of the wrist or more than five pounds of force to operate. The present disclosure is also directed to ensuring that the extension of the power cable and the electrical connector to connect with the electric vehicle fully complies with ADA requirements.

SUMMARY

Briefly stated, an EVSE has a retractable and extendable cable with a connector. A controller and a motorized mechanism extends and retracts the connector. A latch on the connector is depressible to activate a switch. The switch transmits a signal to the controller for forcing the cable and connector to extend away from a pre-established height until the connector is connected to an EV charging inlet or the switch is deactivated.

In one embodiment, the EVSE is mounted to a wall. In another embodiment, the EVSE is disposed at an overhead location. The latch switch is deactivated when the connector is connected to the EV charging inlet. The switch is reactivated when the latch is depressed to release the connector from the EV charging inlet. The latch is preferably a pivoted lever biased by a spring to an unactuated position. The force required to extend and connect the connector to the EV charging inlet is less than 5 lbs.

A method for managing the extension and retraction of an electrical cable and its connector for charging an electric vehicle comprises positioning the connector at a height of approximately 4 feet or less, pressing a latch on the connector to start a motor which extends the electrical cable, and connecting the connector with a charging inlet of the electric vehicle.

The method further comprises releasing the latch when the connector is connected to the electric vehicle. The method further comprises depressing the latch to allow the connector to be released from the electric vehicle after completion of the charging. The method is accomplished by exerting a force of less than 5 lbs. to connect the connector to the charging inlet of the electric vehicle.

A cable management system for an overhead EVSE employing a moveable shuttle comprises an elevated track system. An EVSE shuttle has a housing which supports a service cable with an EV connector. The shuttle has a controller and a motorized mechanism for retracting and extending the service cable. The EVSE shuttle is engageable with the track system and moveable along the track system. A power cable connects the EVSE shuttle with a power source. The service cable is selectively electrically connected to the power cable. The controller and motorized mechanism are activatable to extend the connector to a pre-established height and are responsive to a switch on the connector for retracting and extending the service cable. The service cable and the connector are pullable to position the shuttle at a selected position along the track system.

The EV connector has a latch, and the switch is actuated by the latch. The connector is connectable to a charging inlet of an EV. The switch is reactivated when the latch is depressed to release the connector from the EV charging inlet. The latch is preferably a pivoted lever biased by a spring to an unactuated position. The force required to extend the connector to the charging inlet is less than 5 lbs. The pre-established height is approximately 4 feet in one ADA compliant embodiment.

BRIEF DESCRIPTION OF THE DRAWINGS

FIG. 6 is an elevational view of an overhead mounted EVSE with the cable/connector in the home and locked position;

FIG. 7 is an elevational view of the overhead mounted EVSE of FIG. 6 with the cable/connector lowered to the ADA position;

FIG. 8 is an elevational view of the overhead mounted EVSE of FIG. 7 with the cable/connector being extended by the operator;

FIG. 9 is an enlarged fragmentary view of the operator and the connector for the EVSE of FIG. 8 illustrating the cable being extended by the operator pressing on a latch of a J1772 connector;

FIG. 10 is an elevational view of an overhead mounted EVSE of FIG. 8 with the J1772 connector attached to an electric vehicle for charging;

FIG. 21 is a fragmentary cross-sectional view of a portion of the shuttle system of FIG. 15;

FIG. 21A is an enlarged view of the A-circled portion of FIG. 21;

FIG. 22 is a fragmentary sectional view of a portion of the shuttle system of FIG. 15;

FIG. 22A is an enlarged view of the B-circled portion of FIG. 22;

FIG. 23 is a perspective view of an EVSE carriage unit employed in the shuttle system of FIG. 15;

FIG. 23A is an enlarged view of a portion of the EVSE carriage unit of FIG. 23;

FIG. 24 is an isometric fragmentary annotated view, portions broken away, of a portion of a shuttle system;

FIG. 24A is an enlarged annotated isometric exploded view, portions broken away, illustrating a portion of the shuttle system of FIG. 24;

FIG. 25 is an enlarged perspective view of a power cable employed in the shuttle module of FIG. 15;

FIG. 25A is an enlarged portion of the power cable assembly of FIG. 25;

FIG. 25B is an enlarged portion of the power cable assembly of FIG. 25; and

FIGS. 26A and 26B are perspective views of a wall mounted wireless transmitter and an electrical junction box, respectively employed in the shuttle system of FIG. 15.

DETAILED DESCRIPTION

With reference to the drawings wherein like numerals represent like parts through the several figures, the disclosed cable management system functions to ensure that wall mounted EVSE systems and overhead mounted EVSE systems fully comply with ADA operable parts standards for usage by an operator. A representative wall mounted EVSE system is generally designated by the numeral 10 in FIGS. 1-5 and a representative overhead EVSE system is generally designated by the numeral 12 in FIGS. 6-10. A representative overhead shuttle EVSE system is generally designated by the numeral 1000 in FIGS. 15-24A.

Wall Mounted and Fixed Overhead EVSE System

Figure 1:
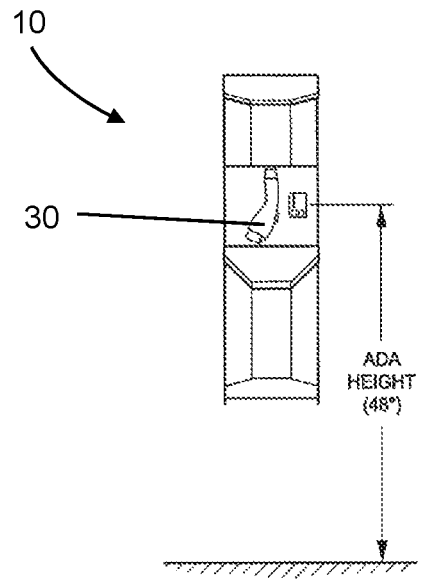
FIG. 1 is an elevational view of a wall mounted EVSE with the cable/connector in the home and locked position and further schematically illustrating the ADA compliant height.
Figure 2:
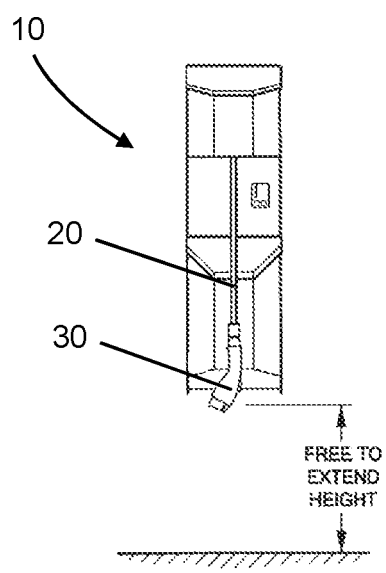
FIG. 2 is an elevational view of the wall mounted EVSE with the cable/connector in an ADA compliant position.
Figure 3:
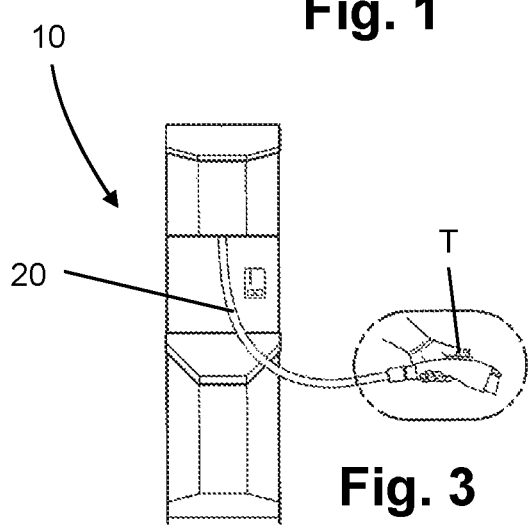
FIG. 3 is an elevational view of the wall mounted EVSE of FIG. 2 with the cable/connector extended by an operator.
Figure 4:
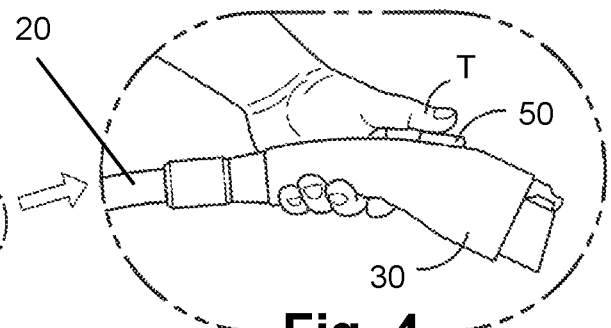
FIG. 4 is an enlarged fragmentary view of the connector and the operator for the EVSE of FIG. 3 illustrating the cable being extended by an operator pressing on a latch of a J1772 connector.
Figure 5:
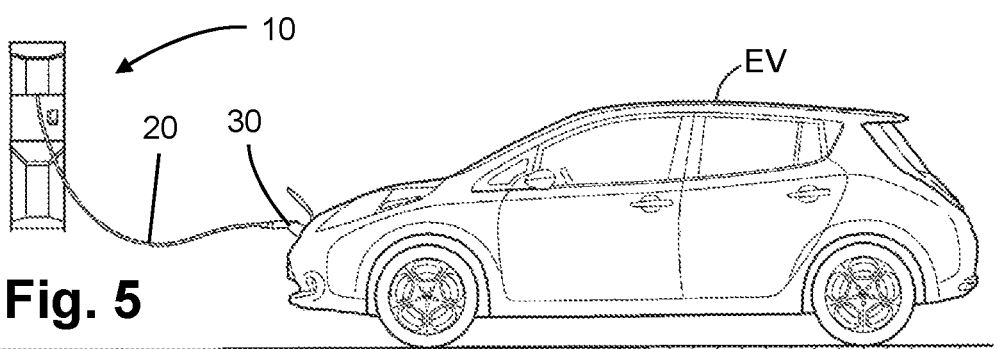
FIG. 5 is an elevational view of the wall mounted EVSE of FIG. 2 with the J1772 connector attached to an electric vehicle for charging.
Figure 11:
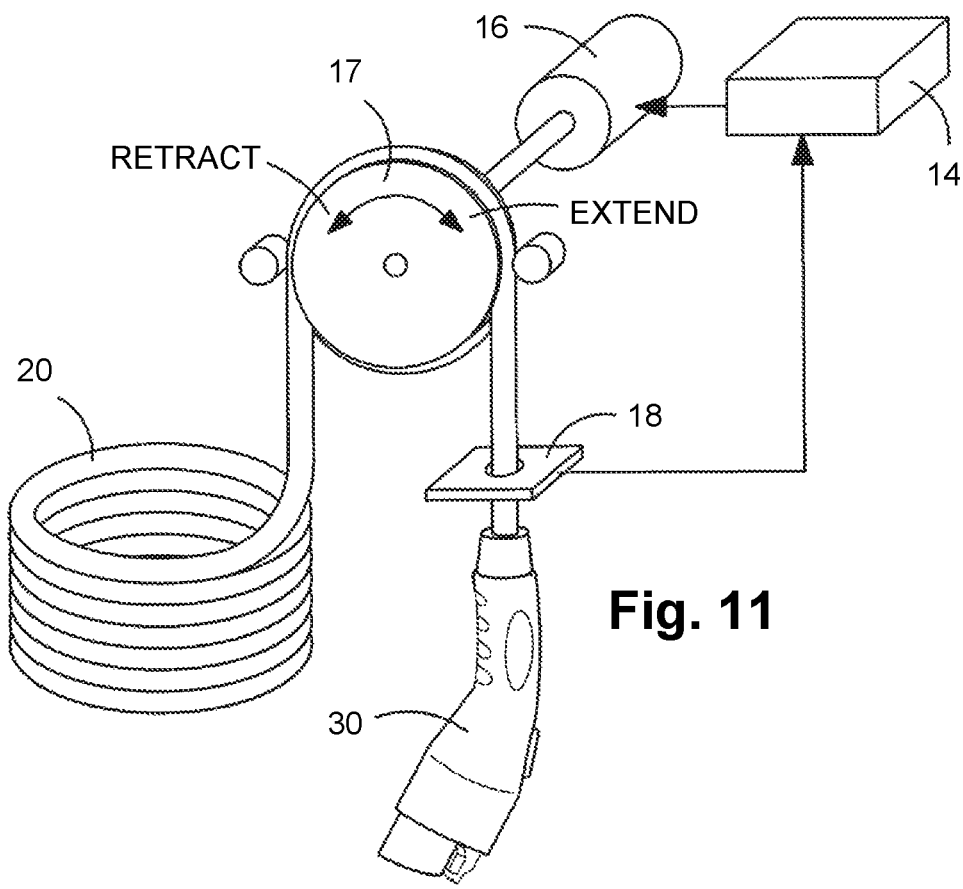
FIG. 11 is a schematic diagram of the components of a cable management system.

With reference to FIG. 11, the wall mounted EVSE 10 and the overhead EVSE 12 each generally employ a controller 14 and a mechanized system, including a motor 16 with a rotatable driver 17, for extending and retracting the electric cable 20 with the J1772 connector 30. A home sensor 18, such as a magnetic switch, is employed to detect the home position of the connector 30.

Figure 12:
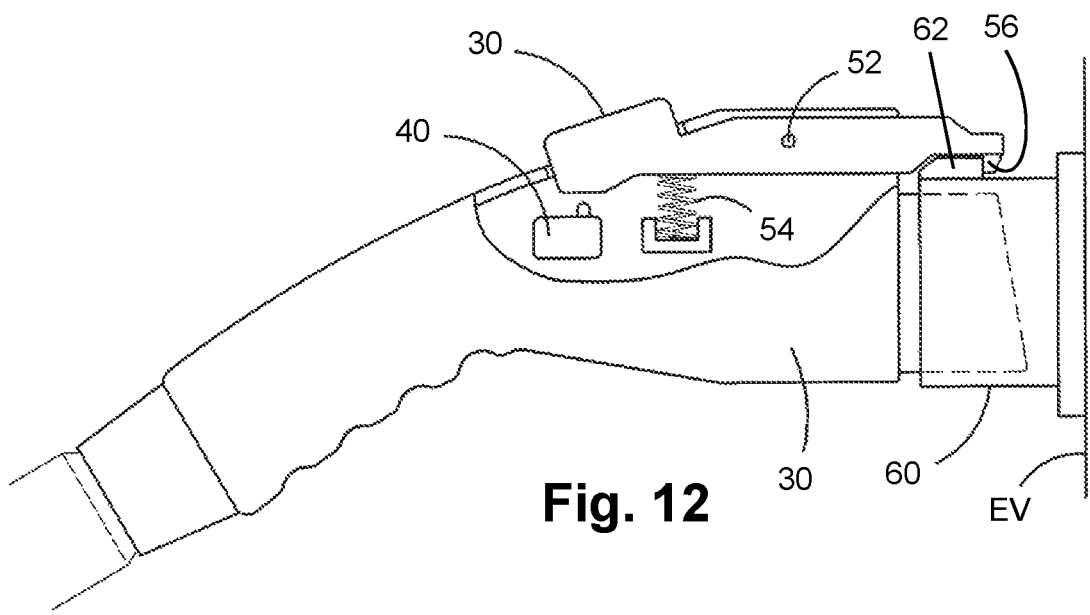
FIG. 12 is a side view, partly in schematic, partly in phantom and partly broken away, illustrating the J1772 connector of FIG. 9 attached to the J1772 inlet and exposing the latch and the latch switch.

In order to ensure that the force which is required to extend the connector and cable from the ADA compliant height is ADA compliant, the J1772 connector 30 is modified, as best illustrated in FIG. 12. The J1772 connector 30 employs a switch 40 which is actuated by a latch 50. The latch functions as a lever and is pivoted about a pivot pin 52. The lever latch 50 is biased by light force spring 54 to an unactivated position, as best illustrated in FIG. 11. The force of the spring 54 is less than 5 lbs. The latch forms a forward catch 56 for engaging the EV charging inlet 60. Upon depressing the lever latch 50 and activating the switch 40, the switch 40 transmits a signal to the controller 14.

With reference to FIGS. 3, 4, 8 and 9, when the connector 30 is at the ADA compliant height and it is desired to extend the cable connector for connecting with the EV, the operator pushes down with the thumb T on the latch 50 which action engages and activates the switch 40. The switch then sends a signal to the cable controller 14 to generate a signal to the motor 16 to rotate the driver 17 in a clockwise position to exert a payout force to extend the cable. The force exerted by the motor ensures that the force to extend the cable and connect same with the EV is less than the ADA five pound threshold. The extension of the cable continues while the operator presses the latch 50 until the latch is released or the latch engages the charging inlet 60.

When the cable is attached to the charging inlet 60 of the EV, the pilot light indicates the electrical connection is detected, the latch catch 56 rides over the inlet detent 62 and the latch is pivotally released, under the force of the spring 54. The switch 40 assumes an unactivated state, and the motor 16 which exerts the ADA cable payout assist force is then stopped. Prior to the connection of the connector 30 with the charging inlet 60, the cable extension may be intermittently extended by pressing on the latch 50 as desired.

Upon completion of the electric charge, the latch 50 is slightly depressed (the force required to depress the latch is considerably less than five pounds) and the J1772 connector 30 is withdrawn. The depression of the latch 50 actuates the switch 40 and, upon subsequent release of the latch 50, signals the controller to reverse the motor 16 and retract the cable. This will allow the cable/connector to be retracted to the ADA compliant position or ultimately to the latch and lock mode.

Figure 13:
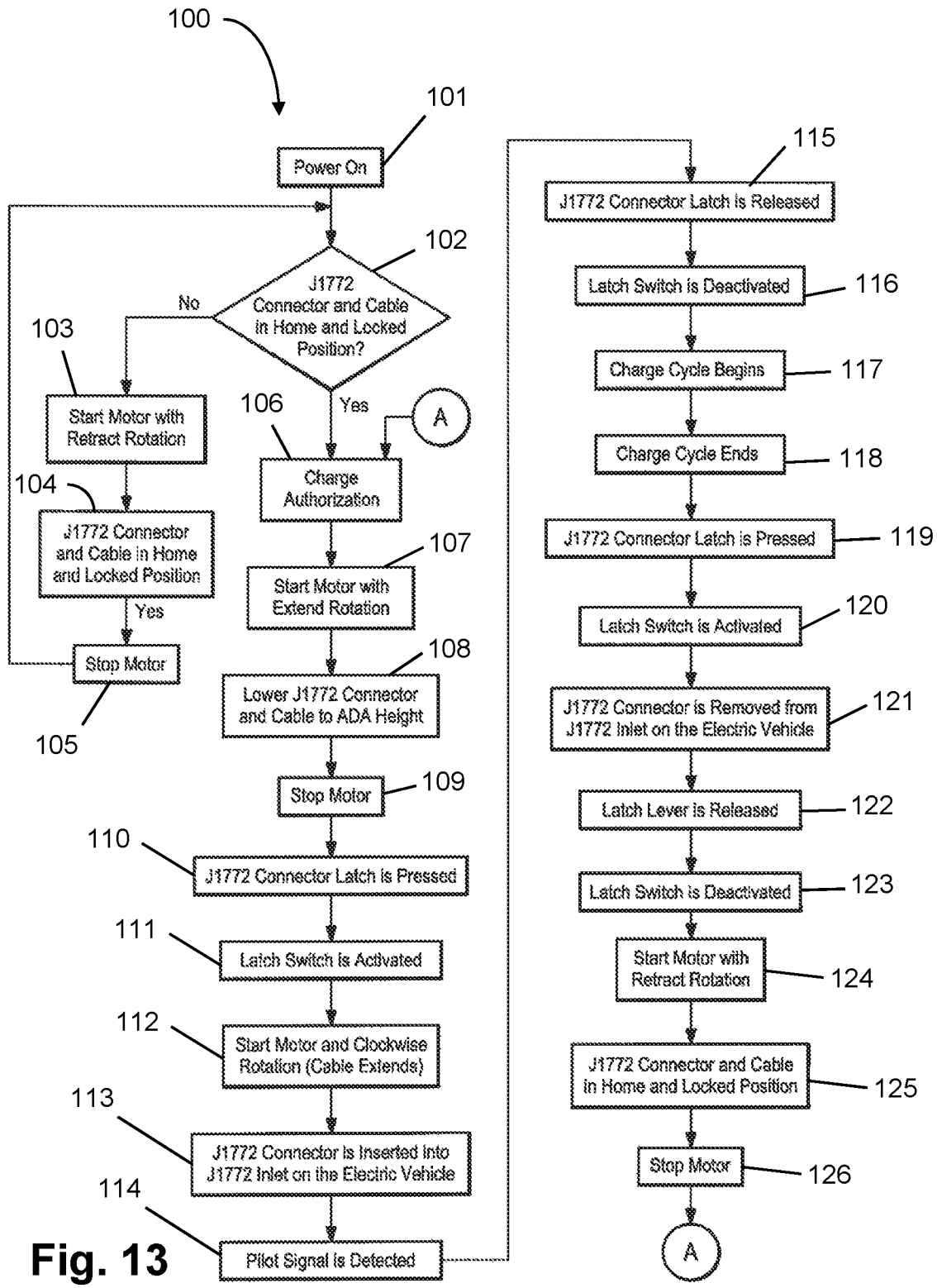
FIG. 13 is a functional block diagram illustrating the operation of the cable management system employing an ADA connector assist.

The operation of the cable management system is illustrated by the functional block diagram 100 of FIG. 13. The operation is illustrated for an ADA height (approximately four feet from the floor). It should be understood that alternately, other pre-established heights are possible.

The power on condition is illustrated with the ADA cable extension assist at 101. If the J1772 connector and cable are not in the home and locked position at 102, then the motor 16 is started and a counterclockwise rotation is undertaken at 103. If the J1772 connector and cable is then confirmed in the home and locked position at 104, the motor 16 is stopped at 105. The J1772 connector 30 and cable 20 are now in the home and locked position at 102, and a charge authorization is made at 106. The motor is started with a clockwise rotation at 107. The J1772 connector and cable are lowered to the ADA height at 108. The motor 16 is stopped at 109.

The operator then presses the J1772 connector latch 50 at 110. The latch switch 40 is activated at 111 and a signal is transmitted to the controller 14. The motor 16 is then started with a clockwise rotation to extend the cable at 112. The J1772 connector 30 is inserted into the J1772 inlet 60 on the electric vehicle at 113. The pilot signal is detected at 114. The latch 50 on the J1772 connector is released at 115.

The latch switch is now deactivated at 116. The charge cycle on the EV begins at 117. The charge cycle on the EV ends at 118.

The latch 50 on the J1772 connector 30 is then pressed at 119. The latch switch 40 is activated at 120. The J1772 connector is removed from the J1772 inlet on the electric vehicle at 121. The latch 50 is released at 122 and the switch 40 is deactivated at 123. The motor 16 is then started with counterclockwise rotation at 124. The J1772 connector and cable are confirmed in the home and locked position by the sensor at 125. The motor is stopped at 126. A charge may now be authorized at 106.

In some embodiments, once the motor is started at 112, the controller 14 has a timer which, upon expiration, causes the motor to stop and then start at 103 and resume operation in order to prevent excessive extension of the cable.

Overhead Movable Shuttle EVSE System

With reference to FIGS. 15-26, a shuttle system for an overhead EVSE, is generally designated by the numeral 1000. The shuttle system is adapted for use in conjunction with service facilities having multiple bays for servicing vehicles including EVs. The shuttle system allows an EVSE to be selectively moved to be positioned so that it can be connected to an electric vehicle wherever it is located within the vicinity. For the illustrated shuttle system 1000 which allows for the usage of two EVSEs 1100, a power sharing arrangement is employed. EVSE 1100 may be substantially identical in form and function to EVSE 12 except for the modifications described below.

The EVSE is conventionally connected to a 40-50 amp power source so that 32 amps is available for supply to the electric vehicle. However, under the power sharing arrangement, if a second EVSE is also employed, each EVSE operates at 16 amps, which is typically sufficient for service-type functions.

In a preferred form, the shuttle system 1000 employs a track system 1010 which is preferably suspended from the ceiling and extends over the multiple bays of the facility. Alternately, the track system 1010 may be elevated or supported above the service bays. The track system employs multiple sections of slotted rails 1020 which are mounted in end-to-end fashion and in parallel. With reference to FIGS. 24 and 24A, the rails 1020 are supported by threaded rods 1030 which extend from the ceiling at spaced locations along the rail. The lengths of the rods are determined by the ceiling height above the floor of the bays. The rails are joined by U-shaped fittings 1032. Spacer brackets 1034 connect between the parallel rows at various locations along the rails to ensure the proper parallel spacing of the rails. Diagonal supports 1036 may be mounted at the various locations to prevent sway and ensure the rigidity of the track system. With reference to FIGS. 21-22, the rails each include a longitudinal lower slot 1022 which is defined by a pair of longitudinally extending support flanges 1024. The flanges 1024 may be slightly concave.

With reference to FIGS. 23 and 23A, each EVSE 1100 at an upper cover mounts two pairs of tandem roller assemblies 1040 which essentially form an EVSE carriage or shuttle. The roller assemblies 1040 are spaced and dimensioned so that they are received in the rails and longitudinally roll along the rails. The underside of the EVSE 1100 includes the EVSE J1772 connector 1102 and the cord 1101 which winds and unwinds from the EVSE unit.

With reference to FIGS. 25-25B, a plurality of substantially identical cord roller sets 1050 are attached at generally equidistantly spaced locations to the power cable 1060 which extends from an upper junction box 1070 to the EVSE 1100 to supply power to the EVSE. Each roller set 1050 includes a U-shaped yoke 1052 which mounts an axle 1053 with tandem rollers 1054. A rod 1056 includes an eyelet 1057 and is bolted to the underside of the yoke. A strap 1058 wraps around the power cable at various spaced locations along the power cable. The strap 1058 is bolted through the eyebolt so that the cord may be supported above the service bays, and the cord may be configured in a looped configuration depending upon the placement of the EVSE unit along the track system. Each end of the cable preferably has a mesh grip-strain relief 1062 to provide a strain relief at each end of the cable. In one embodiment, the power cable 1060 has 40-46 feet of travel along the track system.

It will be appreciated that the cables 1060 connect at a central location with an electrical conduit 1064 which extends from a breaker panel 1066. A wireless controller 1080 may also be mounted for operating and controlling the EVSE cable and its connection with an electric vehicle (FIG. 41). Initially, the connector is lowered from a locked position against or adjacent the EVSE housing to a height of four feet (or other pre-established height) above the bay. Naturally, each of the EVSE units 1100 is longitudinally moveable along the tracks by grasping the connector 1102 and pulling the EVSE 1100 to the proper position.

Figure 15:
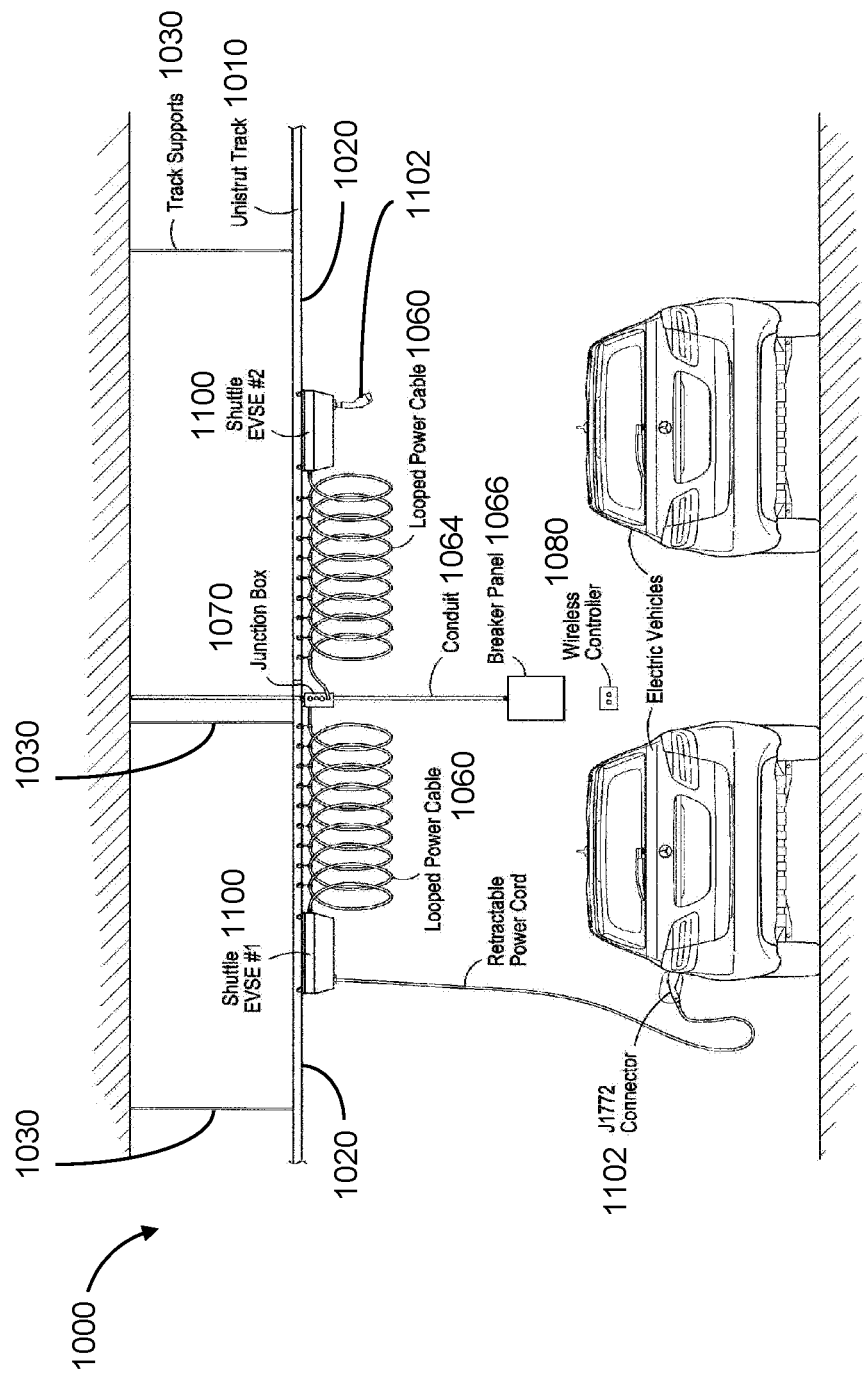
FIG. 15 is an annotated elevational view of a shuttle system for an overhead EVSE illustrated in conjunction with two electric vehicles.
Figure 16:
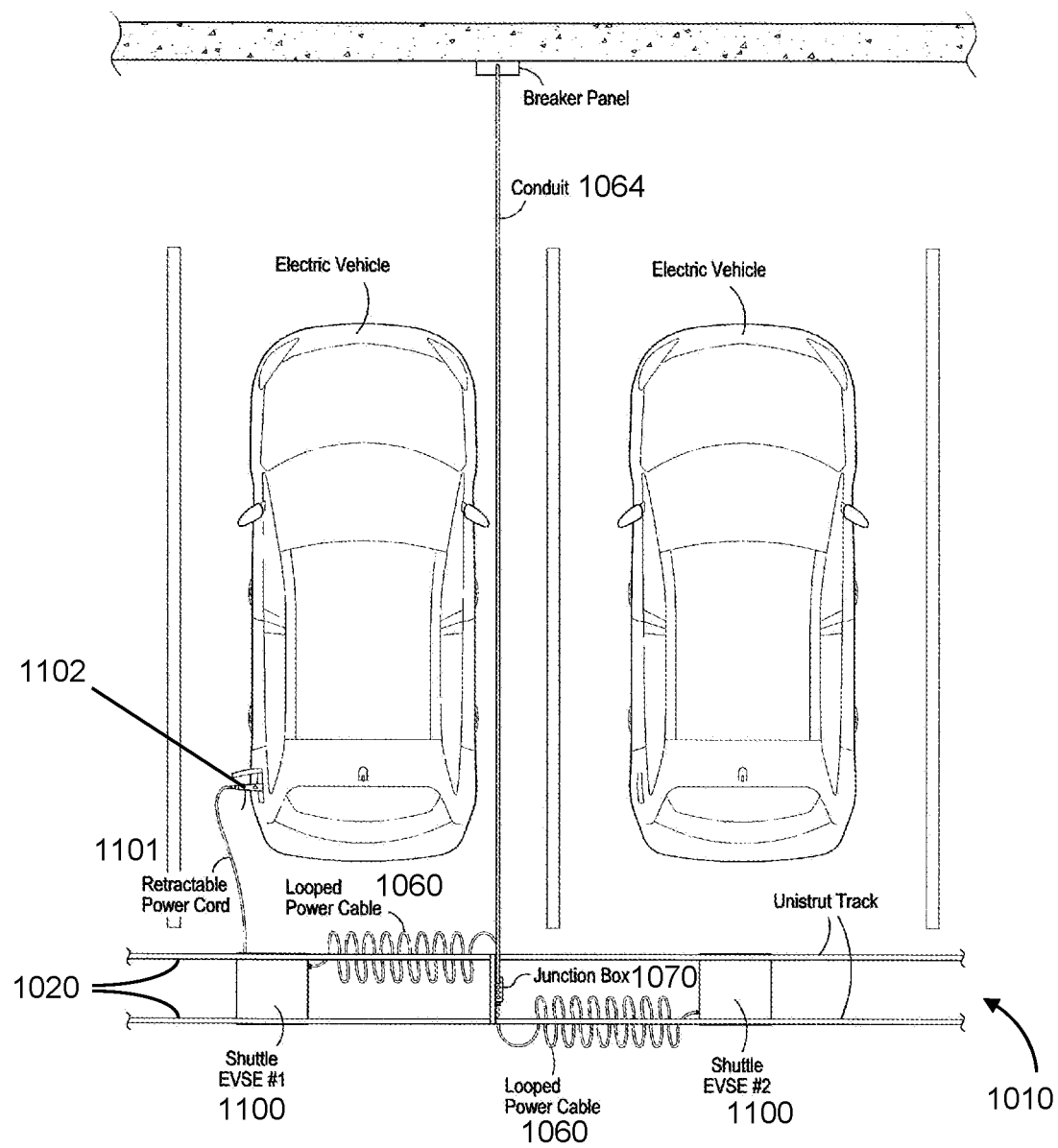
FIG. 16 is an annotated fragmentary top plan view of the shuttle system and the electric vehicles of FIG. 15.
Figure 17:
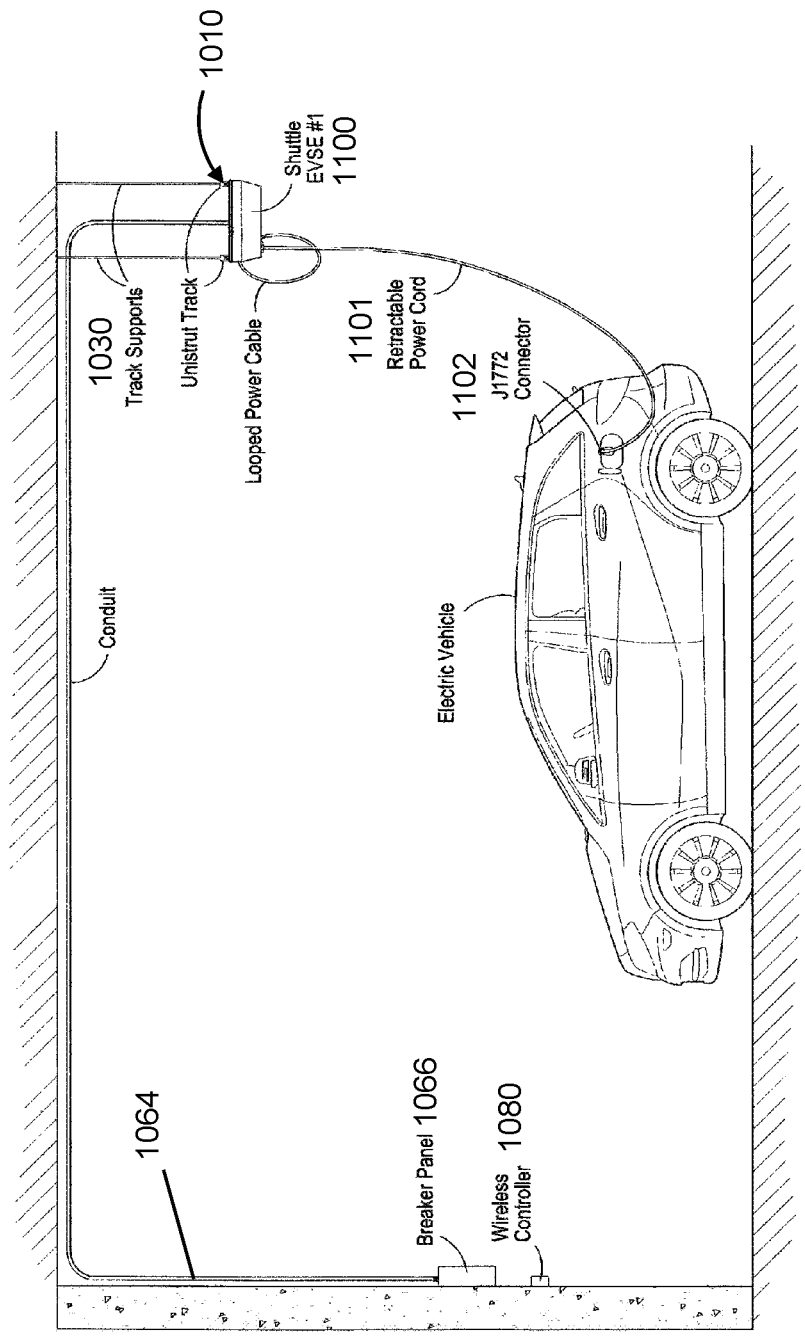
FIG. 17 is an annotated side elevational view of a portion of the shuttle system and electric vehicles of FIG. 15.

As illustrated in FIG. 15, an electric vehicle is parked in a bay adjacent the end of the shuttle installation. The wireless controller 1080 may be activated for EVSE #1. The retractable power cord 1101 is unwound, extended and connected via the J1772 connector 1102 to the electric vehicle. The electric vehicle in the second bay is not at that time connected to an EVSE which is adjacently positioned.

Figure 18:
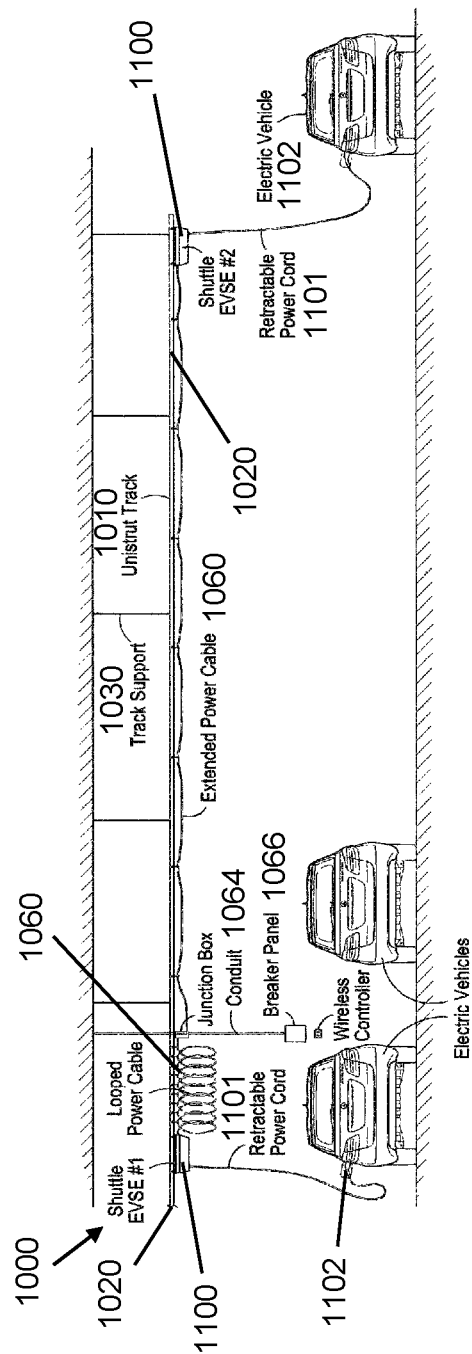
FIG. 18 is an annotated elevational view of a shuttle system for an overhead EVSE illustrated in conjunction with three electric vehicles further illustrating an operational mode thereof.

As best illustrated in FIG. 18, the EVSE #2 has been moved to a position adjacent an electric vehicle significantly spaced from its initial position of FIG. 15. The retractable power cord 1101 is connected via the J1772 connector 1102 to the electric vehicle for servicing. FIG. 18 illustrates that two electric vehicles are connected to an EVSE for servicing. It will be appreciated that the power cable 1060 is extended from the loop configuration illustrated in FIG. 15 to a more extended configuration for the position of FIG. 18.

Figure 19:
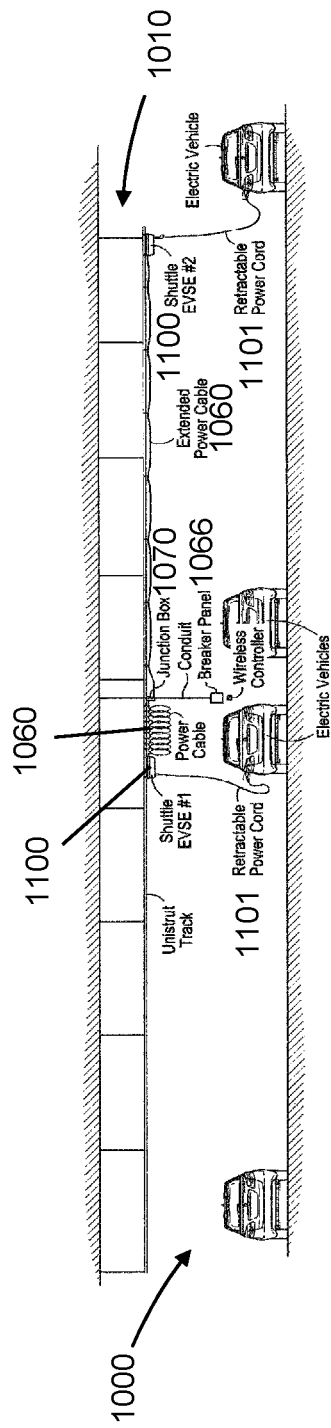
FIG. 19 is an annotated elevational view of a shuttle system for an overhead EVSE illustrated in conjunction with four vehicles.
Figure 20:
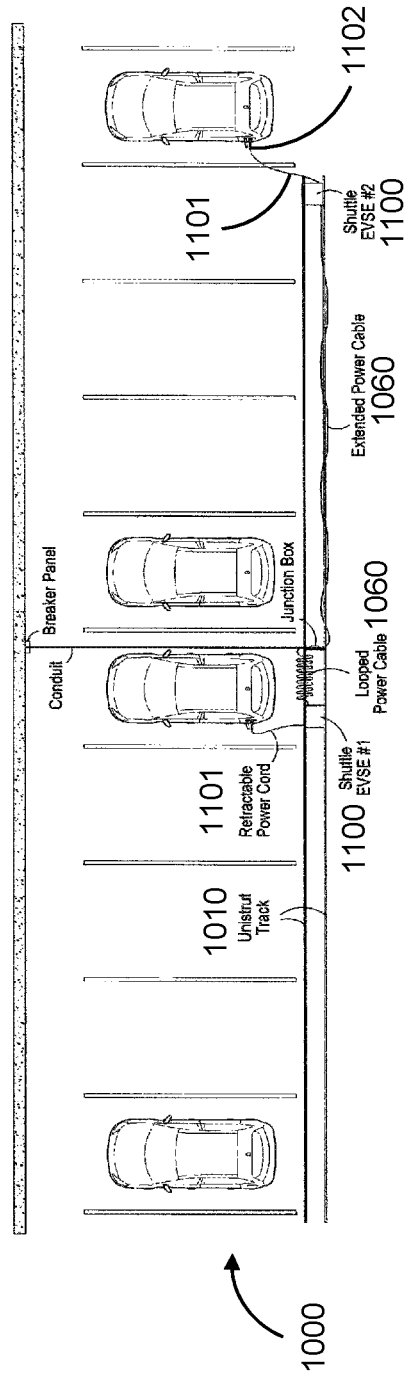
FIG. 20 is an annotated top view of the shuttle system and vehicles of FIG. 19.

FIGS. 19 and 20 further illustrate the flexibility of the EVSE shuttle system which allows a single EVSE or two EVSEs to service several vehicles as required in a service facility. The EVSE can be easily displaced by pulling on the connector and/or cord and positioned at any bay as required. The cable 1060 is totally elevated so that there is no danger from tripping on the electric cable on the floor. Either a single EVSE 1100 or two EVSEs 1100 may be employed and connected for power sharing as illustrated.

Figure 14:
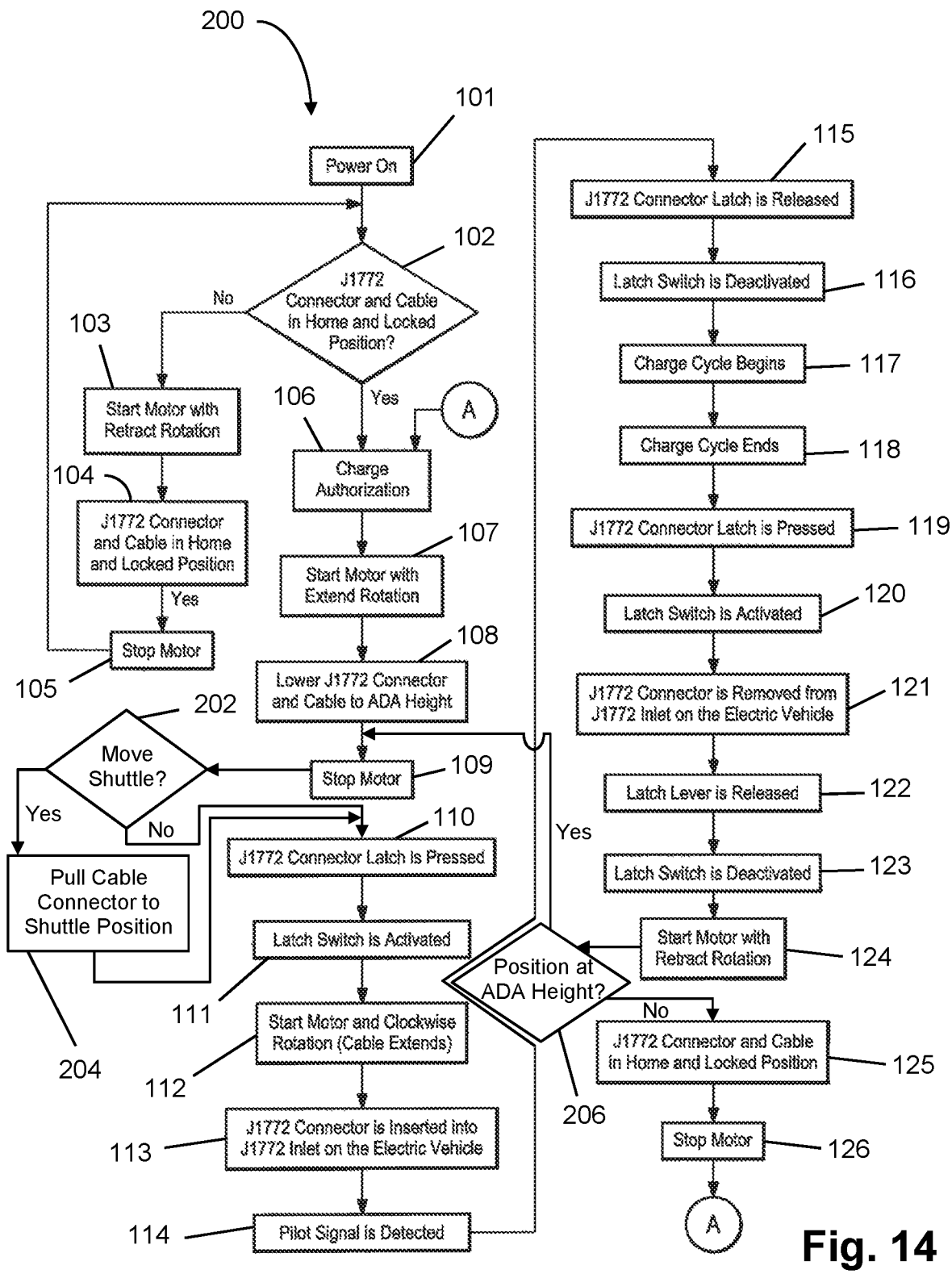
FIG. 14 is a functional block diagram illustrating the operation of the cable management system employing an ADA connector array in conjunction with a shuttle system of an overhead EVSE.

The operation of the cable management system in conjunction with the shuttle system for an overhead EVSE 1000 is illustrated by the functional block diagram 200 of FIG. 14. The operation of the cable management system functions generally as previously described by the functional block diagram 100 of FIG. 13 except for the modifications noted below.

After the connector 1102 and cord or cable 1101 are lowered to the ADA height or the pre-established height at 108, the motor 16 is stopped at 109. At this point, the position of the connector and attached cable are essentially locked at a given extension length below the shuttle 1100. If desired at 202, the connector and/or cable may then be manually grasped and the shuttle pulled to a selected position 204 along the track 1010.

Once the selected shuttle position is reached, the operator then presses the J1772 connector latch 50 at 110. The latch switch 40 is then activated at 111 and a signal is transmitted to the controller 14. The motor 60 is then started with a clockwise rotation to extend the cable at 112. The connector 30 is then inserted into the J1772 inlet on the electric vehicle at 113. The pilot signal is detected at 114 and the latch on the J1772 connector is released at 115. The rest of the cycle is replicated in the same fashion as previously described for a functional block diagram 100.

It should be appreciated that for some embodiments, upon the starting of the motor with the retract rotation at 124 when it is desired to first return the connector to the ADA or pre-established position at 206, the motor may be optionally stopped at the pre-established compliant position. At this position, the cable management system may be returned to the stop motor position at 109, at which time, the connector/cable may optionally be pulled to move the shuttle 1100 to a selected position along the track at 204 or optionally, the cable may then be extended to connect with an EV inlet of another electric vehicle at 110-113.

While preferred embodiments have been set forth for purposes of illustration, the foregoing descriptions should not be deemed a limitation of the invention herein. Accordingly, various modifications, adaptations and alternatives may occur to one skilled in the art without departing from the spirit and the scope of the present invention.

The invention claimed is:

1. An EVSE comprising:
   a retractable and extendable cable with an EV connector;
   a motorized mechanism for extending and retracting said cable
   a controller which controls said motorized mechanism and implements a home position and an ADA assist position of said EV connector;
   a latch on said EV connector which is pressable to activate a switch which transmits a first signal to said controller that forces the cable and EV connector to extend away from a pre-established height until the connector is connected to an EV charging inlet or the switch is deactivated and the latch is released, and the latch is subsequently pressed and the latch released, and upon disconnecting the EV connector from the charging inlet, the switch is deactivated to transmit a second signal to said controller to retract the cable to a position wherein said EV connector is at the home position or the ADA assist position.

2. The EVSE of claim 1 wherein said EVSE is mounted to a wall.

3. The EVSE of claim 1 wherein said EVSE is disposed in an overhead location.

4. The EVSE of claim 1 wherein said latch switch is deactivated when said EV connector is connected to the charging inlet.

5. The EVSE of claim 1 wherein said switch is reactivated when said latch is depressed to release the connector from said EV charging inlet.

6. The EVSE of claim 1 wherein said latch is a pivoted lever biased by a spring to an unactuated position.

7. The EVSE of claim 1 wherein the force required to extend and connect the connector to the EV charging inlet is less than five pounds.

8. An EVSE comprising:
   a retractable and extendable cable with an EV connector;
   a motorized mechanism for extending and retracting said cable;
   a controller which controls said motorized mechanism and implements a home position and an ADA assist position for said EV connector; and
   a pivotal member on said EV connector forming a releasable latch and being pressable to activate a switch which transmits a first signal to said controller that forces the cable and EV connector to extend away from a pre-established height until the EV connector is connected to an EV charging inlet or the switch is deactivated and the latch released, and the member is subsequently pressed and the switch activated upon disconnecting the EV connector from the charging inlet, and the switch is subsequently deactivated to transmit a second signal to the controller to retract the cable and EV connector to a position wherein said EV connector is at the home position or an ADA assist position.

9. The EVSE of claim 8 wherein said EVSE is mounted to a wall.

10. The EVSE of claim 8 wherein said EVSE is disposed in an overhead location.

11. The EVSE of claim 8 wherein said latch switch is deactivated when said EV connector is connected to the charging inlet.

12. The EVSE of claim 8 wherein said switch is reactivated when said latch is depressed to release the connector from said EV charging inlet.

13. The EVSE of claim 8 wherein said member is a pivoted lever biased by a spring to an unactuated position.

14. The EVSE of claim 8 wherein a force required to extend and connect the connector to the EV charging inlet is less than five pounds.

* * * * *